(12) United States Patent
Castro et al.

(10) Patent No.: US 9,569,543 B2
(45) Date of Patent: Feb. 14, 2017

(54) SHARING OF DOCUMENTS WITH SEMANTIC ADAPTATION ACROSS MOBILE DEVICES

(75) Inventors: Paul C. Castro, Sharon, MA (US); Yun-Wu Huang, Chappaqua, NY (US); Peter Kissa, Zilina (SK); John J. Ponzo, Shrub Oak, NY (US); Gegi Thomas, Piermont, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 868 days.

(21) Appl. No.: 13/006,871

(22) Filed: Jan. 14, 2011

(65) Prior Publication Data

US 2011/0179115 A1 Jul. 21, 2011

Related U.S. Application Data

(60) Provisional application No. 61/295,485, filed on Jan. 15, 2010.

(51) Int. Cl.
*G06F 15/16* (2006.01)
*G06F 17/30* (2006.01)
*H04L 29/06* (2006.01)

(52) U.S. Cl.
CPC ... *G06F 17/30867* (2013.01); *H04L 29/06401* (2013.01)

(58) Field of Classification Search
CPC ... G06Q 10/10; H04L 29/06; H04L 29/08072; H04L 29/06034; H04L 29/06401; H04L 67/38; H04L 65/4015; G06F 17/211; G06F 17/30867

USPC .......................................................... 709/204
See application file for complete search history.

(56) References Cited

U.S. PATENT DOCUMENTS

| | | | |
|---|---|---|---|
| 7,213,051 B2 * | 5/2007 | Zhu et al. ...................... | 709/205 |
| 7,353,252 B1 * | 4/2008 | Yang et al. ..................... | 709/204 |
| 7,653,001 B2 | 1/2010 | Agrawal et al. | |
| 8,176,123 B1 * | 5/2012 | Wang et al. ..................... | 709/204 |
| 2006/0053194 A1 * | 3/2006 | Schneider et al. ............. | 709/204 |
| 2006/0053195 A1 * | 3/2006 | Schneider et al. ............. | 709/204 |

(Continued)

OTHER PUBLICATIONS

B. A. Myers et al., "Using Multiple Devices Simultaneously for Display and Control," IEEE Oct. 2000, 1070-9916/00 Copyright 2000 IEEE.

(Continued)

*Primary Examiner* — Tamara T Kyle
(74) *Attorney, Agent, or Firm* — Cantor Colburn LLP; Kevin Jordan

(57) ABSTRACT

A method for sharing documents includes initiating a sharing session with a first participant and a second participant, wherein the first participant is communicatively connected to the second participant via a server, receiving a control request having an action from the first participant, determining whether the control request includes a share page action, and retrieving components of the page with available component types and sending components associated with preferences of the first participant to the first participant and components associated with preferences of the second participant to the second participant responsive to determining that the control request includes the share page action.

14 Claims, 6 Drawing Sheets

(56) References Cited

U.S. PATENT DOCUMENTS

| | | |
|---|---|---|
| 2006/0253280 A1* | 11/2006 | Harband ............ G10L 13/00 704/223 |
| 2007/0083810 A1* | 4/2007 | Scott et al. ............ 715/525 |
| 2007/0139371 A1 | 6/2007 | Harsham et al. |
| 2007/0161382 A1 | 7/2007 | Melinger et al. |
| 2007/0260675 A1 | 11/2007 | Forlines et al. |
| 2008/0248834 A1 | 10/2008 | Chatterjee et al. |
| 2008/0320396 A1* | 12/2008 | Mizrachi .......... H04M 1/72561 715/744 |
| 2009/0030952 A1 | 1/2009 | Donahue et al. |
| 2009/0109126 A1 | 4/2009 | Stevenson et al. |
| 2009/0112985 A1* | 4/2009 | Quinn et al. ............ 709/204 |
| 2009/0276696 A1 | 11/2009 | Kapoor et al. |
| 2010/0005394 A1 | 1/2010 | Dubnov |
| 2011/0252093 A1* | 10/2011 | Spataro et al. ............ 709/204 |

OTHER PUBLICATIONS

G. Ortiz et al., "Adapting Web Services for Multiple Devices: a Model-Driven, Aspect-Oriented Approach," Copyright 2009 IEEE, pp. 754-761.

S. W. Lauzac et al., "Programming Views for Mobile Database Clients," downloaded Feb. 3, 2010 from IEEE Xplore, pp. 1-6.

* cited by examiner

SHARING OF DOCUMENTS WITH SEMANTIC ADAPTATION ACROSS MOBILE DEVICES

CROSS-REFERENCE TO RELATED APPLICATIONS

This application claims the benefit of U.S. Provisional Application No. 61/295,485, filed Jan. 15, 2010.

BACKGROUND

The present invention relates to mobile computing devices, and more specifically, to document sharing in mobile devices.

New-generation mobile devices such as smartphones have become increasingly popular. Compared to mobile devices a few years ago, these new-generation mobile devices have better processing power, more RAM and storage memory, a screen with higher resolution, and higher communication bandwidth (e.g., 3G and WiFi). Many business software applications have been written that target smartphones as a key running platform.

In file sharing software systems, a first user may use a mobile device to view the content of a remote document. The first user may also invite other users to view the same content that this first user is viewing, but on their respective mobile devices. The first user, being the initiator of the shared viewing process, may control what pages to view and use zoom/pan functions to change image resolution and navigate the viewable areas within a page. The shared viewing process may be synchronized such that the viewing content changes resulted from the first user's zoom/pan actions are propagated across the mobile devices for all participants. The first user may also delegate the controller role to a second user.

This class of software system facilitates close collaboration among multiple users over a document. Users can be at remote locations yet still able to view and share documents with other mobile users. This class of software system helps improve business productivity.

The shared document viewing is achieved by first running the rich document software to display the document, and then using screen sharing software to share the displayed images across the network. Mobile devices though much improved over those a few years ago, still lacks the computing power, the RAM and storage memory, and consistent high-bandwidth communication of a desktop or laptop computer. As a result, applications that process rich documents, are targeted towards traditional PCs. In general, they are too cumbersome to run on smartphones. The rich documents also tend to have a large size. Storing them locally on a mobile device with limited storage memory is difficult. The previous approach to shared document viewing therefore is not generally applicable for mobile devices.

BRIEF SUMMARY

According to one embodiment of the present invention, a method for sharing documents includes initiating a sharing session with a first participant and a second participant, wherein the first participant is communicatively connected to the second participant via a server, receiving a control request having an action from the first participant, determining whether the control request includes a share page action, and retrieving components of the page with available component types and sending components associated with preferences of the first participant to the first participant and components associated with preferences of the second participant to the second participant responsive to determining that the control request includes the share page action.

According to another embodiment of the present invention a system for sharing documents includes a server operative to initiate a sharing session with a first participant and a second participant, wherein the first participant is communicatively connected to the second participant via the server, receive a control request having an action from the first participant, determine whether the control request includes a share page action, and retrieve components of the page with available component types and sending components associated with preferences of the first participant to the first participant and components associated with preferences of the second participant to the second participant responsive to determining that the control request includes the share page action.

According to another embodiment of the present invention a non-transitory computer-readable storage medium including computer executable instructions that, when executed on a processor of a computer apparatus, direct the processor to perform a method for sharing documents including initiating a sharing session with a first participant and a second participant, wherein the first participant is communicatively connected to the second participant via a server, receiving a control request having an action from the first participant, determining whether the control request includes a share page action, and retrieving components of the page with available component types and sending components associated with preferences of the first participant to the first participant and components associated with preferences of the second participant to the second participant responsive to determining that the control request includes the share page action.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
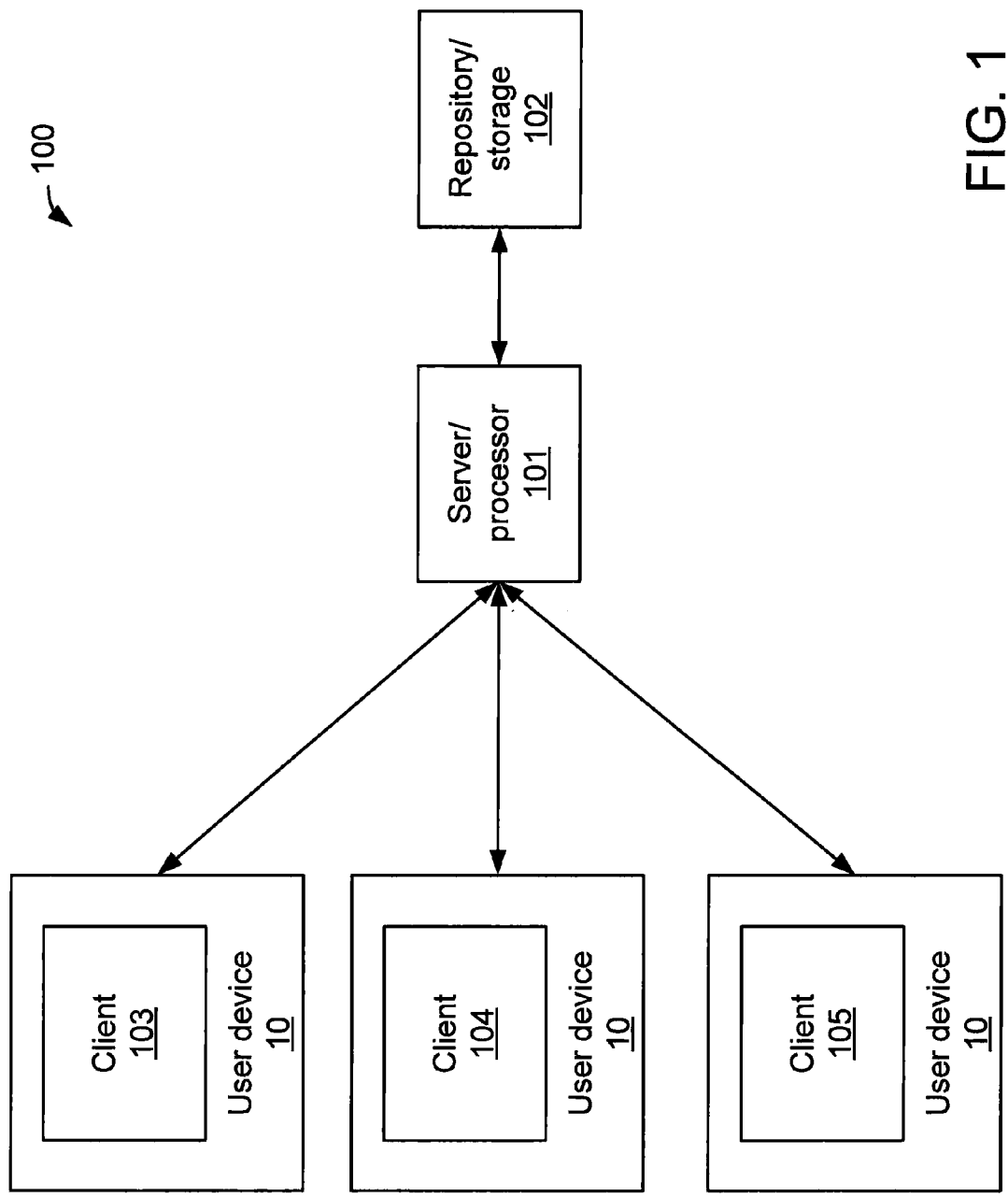
FIG. 1 illustrates an exemplary embodiment of a system.

In the illustrated embodiments, a shared document is stored in a remote server, and may not be downloaded to the mobile devices in full due to the potential large size of the document and the lack of the mobile applications that may process the shared document on the mobile devices. Instead of downloading the full document, the document is first converted into a collection of individual components, called semantic components, each of which may be downloaded and processed on the mobile devices. The conversion process occurs on a server, which may also store the resultant collection of components.

The semantic components may have different types such as, for example, text or image components. The original document may include a presentation document, such as a slide presentation, which may contain text, images, graphic objects, and some structure formats and scripts. The image components of such presentation document are a collection of images, each being an image of a presentation slide of the document. A text component of a presentation document may be the textual representation of a bullet point slide of this presentation document. Another example of a text component of a presentation document may be the speaker note of a slide in this presentation document. Yet another semantic component type can be voice. A voice component of a textual document can be created using the text-to-voice software.

Each semantic component may model one page of a paged document such as a word processing document. It may model a slide of a presentation document. It can also model a logical unit of a document, not separated by pages or slides, where there exists a logical separation of the document.

The determination of which types of semantic components to create for a shared document may be based on the request made from each user participating the sharing of this document. Different mobile devices may have different levels of capabilities, with some capable of processing image components whereas some only text components. Different users may request different component types of their respective preferences with some preferring voice while others text.

During the sharing of a document, the semantic components of the document are transmitted to the mobile devices. Once downloaded on a mobile device, a component is processed and manifested in some way to the user. The manifestation can be through display on the screen, such as image or text, or through other interface such as voice over speakers.

The sharing process of a document may be synchronized across all devices participating in this sharing session. In this case, a user has the privilege to control the sharing process by navigating from one component to another, or by navigating within one component, such as an image, through zooming or panning. The first user that selects the document to share and invites other user to the sharing session can be the initial controller. The controller can also relegate the controller role to another user.

In addition to navigation, zooming and panning, the controller may create annotation on top of a semantic component. An annotation can be the semantic of a highlight or a pointer. The semantic of a highlight over a component may be implemented differently according to the underlying component type. For example, with an image component, the semantic of a highlight may include a translucent path mimicking a highlighter mark. For text component, the semantic of a highlight may include the bold-facing of certain text. The semantic of a pointer over an image component can be a small pointer image whereas that on a text component may include special characters such as "4".

The controller may also have the privilege to edit the semantic component. The text components are likely candidates for editing on mobile devices. The moderator may choose to download a text component or change its content. In synchronized sharing, such editing changes can be propagated across all devices participating in the current sharing session. Any editing changes can result in the change of the original document.

FIG. 1 illustrates an exemplary embodiment of a system 100. In this regard, the system 100 includes a server 101 that includes a processor that is operative to run applications such as, for example, a server-side Internet application that receives requests from a client to process document sharing. The server 101 is communicatively connected to a repository 102 that includes a memory or storage system and provides storage services for document files. For example, the repository may include a Web-based file system that stores and manages files accessible by the users through Internet-based API. User devices 10 may include any type of user processing device such as, for example, a personal computing device, a mobile telephone or smartphone, mobile reader device, or mobile computing device. The clients 103, 104 and 105 include a mobile software application installed in a user device 10. The clients 103, 104, and 105 may include a client-side Web application executed by the a browser on a mobile device 10.

Figure 2:
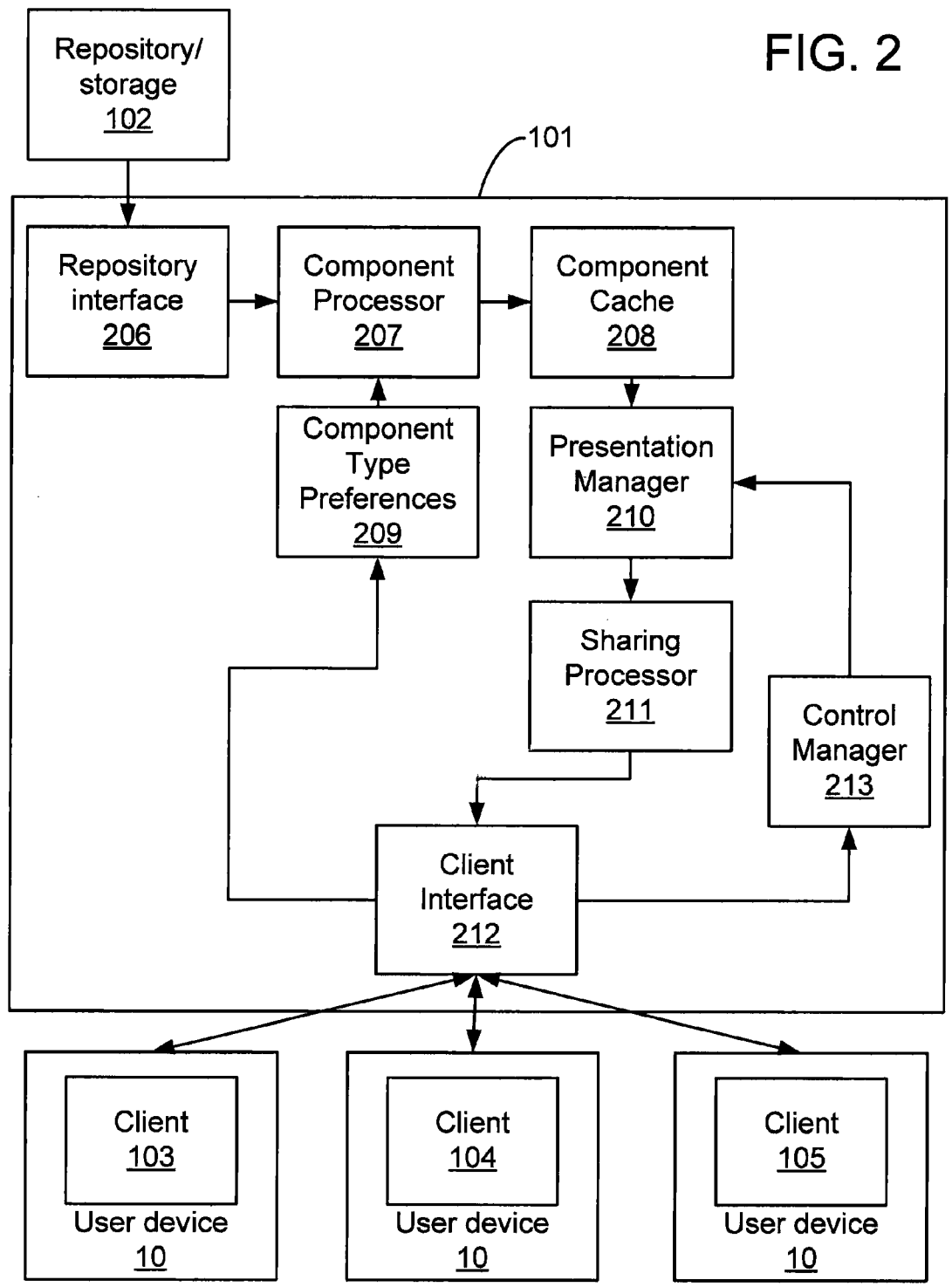
FIG. 2 illustrates a block diagram of the server of FIG. 1.

FIG. 2 illustrates a block diagram of the server 101 that includes blocks representing hardware components and software components that perform a variety of logical operations. In this regard, a repository interface 206 performs logic to communicate with the repository 102. Upon receiving a document sharing request from a user, the repository interface 206 is operative to log into the repository 102, retrieve meta information of documents from the repository 102, update the documents, and create a new document at the repository 102. The component processor 207 includes logic that receives an input document from the repository interface 206 and converts the document into a collection of semantic components. The semantic components may have different format types. The component processor 207 determines how to create the semantic components based on the component type preferences 209 information, which may be set either by requests from the clients 103, 104, 105, or preconfigured by the system 100. Once the semantic components are created by the component processor 207, they are stored in component cache 208. The component cache 208 stores and manages the semantic components, which can be stored in memory such as, for example, random access memory (RAM) or other types of memory.

The presentation manager 210 takes the semantic components from component cache 208 and prepares them for presentation by taking into account the current control actions from the client 103 who, in the illustrated embodiment, has the privilege as the controller. The control actions may include page switching, zooming and panning on a page, adding annotations, and editing and updating on a page. The sharing manager 211 manages the sharing session, ensuring that all clients 103, 104, 105 receive the current semantic components prepared by the presentation manager 210, which incorporated the current control actions.

The software module control manager 213 processes control actions received, through client interface 212 and from the controller client 203. In the illustrated embodiment, a control action may change the currently shared page, zoom and pan on the currently viewed page, add an annotation such as highlight or pointer, or edit a page. Each different type of semantic components in the component cache 208 may result in a different processing method for a control action. For example, control manager 213 may implement a highlight action over an image component by creating a translucent path mimicking a highlighter mark. For text component, a highlight can be created by the bold-facing of selected text. The semantic of a pointer over an image component may be a small pointer image whereas that on a text component can be a special characters such as "4". The control manager 213 includes the logic of what action to take with a specific control action for a specific semantic component type.

The client interface 212 includes logic facilitating the communication between the server 101 and clients 103, 104, and 105. The interaction patterns between the server 101 and clients 103, 104, and 105 may include both the pull and push patterns. For example, when the controller client 203 takes a control action, the control manager 213 receives the control action input, processes the input accordingly and submits the result to presentation manager 210 for incorporation into the semantic components that are given to sharing processor 211. The sharing processor 211 pushes these components to clients 103, 104, and 105 through the client interface 212. The actual implementation of the push mechanism is achieved by the client interface 212. The client interface 212 also supports several request types such as the START, JOIN and CONTROL requests.

Figure 3:
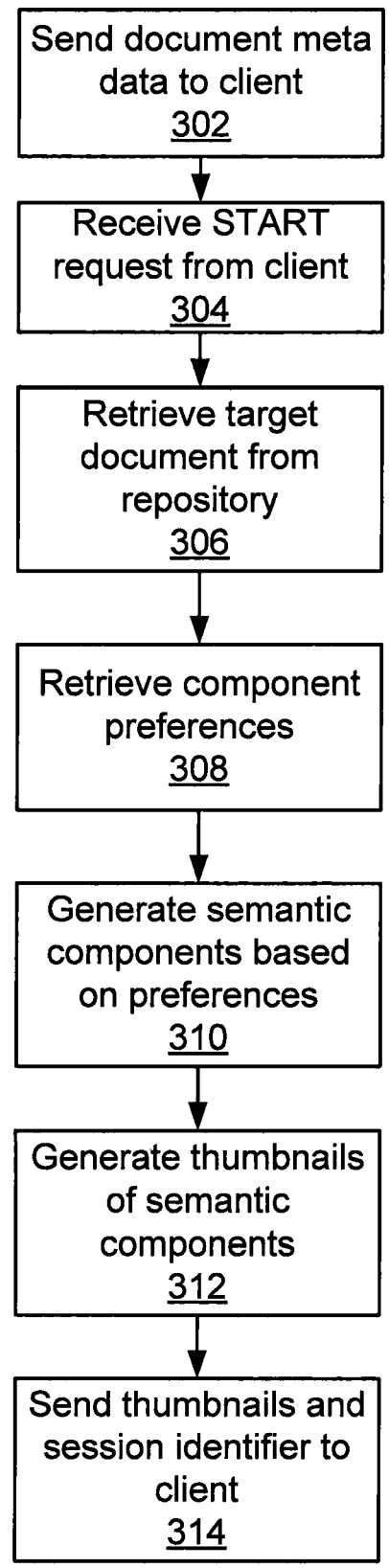
FIG. 3 illustrates a block diagram of an exemplary method for processing a start request.

FIG. 3 illustrates a block diagram of an exemplary method for processing a start request. To issue a START request, the controller client 103 (of FIG. 1) requests from the repository 102 a list of meta information associated with the documents accessible from the client 103. The meta information for each document may include, for example, document name, unique document identifier, author, creation date, and document type. Upon receiving this meta information, the client then displays a list of available documents for the user to choose to share. In block 302, the meta information may be sent to the client 103 upon the client 103 directly making request to the repository 102, or by the server 101 serving as the intermediary between client 103 and the repository 102. The user selects a document to share, and the client 103 sends the START sharing request with the identifier of the selected document to the server 101 to start a sharing session. Upon receiving a START request from the controller client 103 in block 304, the server 101 retrieves the document from the repository 102 in block 306.

The server 101 retrieves the component preference information either from the client 103 or a configuration file in block 308. In block 310, the server 101 employs the component processor 207 to generate proper semantic components for the target document based on the component preference information. In block 312, the component processor 307 may also create a thumbnail version of the semantic components. The thumbnail of a semantic component is an abridged version of the component. For example, the thumbnail of an image page is a smaller scaled-down version of the image. The thumbnail of a text page may include a smaller text block with, for example, the first sentence of the corresponding text page. After thumbnails of the target document are created, the thumbnails are sent with a unique session identifier, to the client 103 in block 314.

Figure 4:
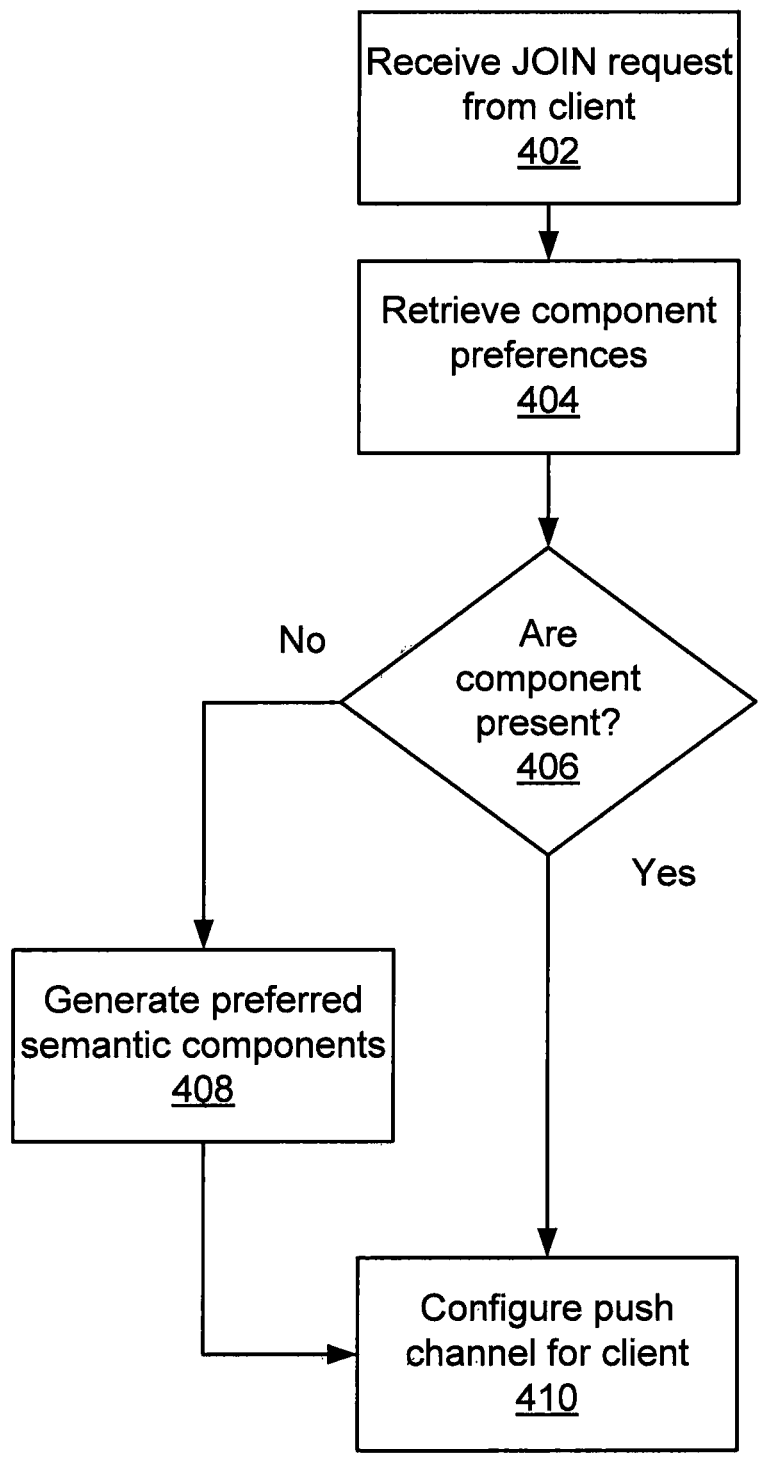
FIG. 4 illustrates a block diagram of an exemplary method for adding additional clients to a session.

FIG. 4 illustrates a block diagram of an exemplary method for adding additional clients to the session. Upon receiving the session identifier and the thumbnails, the controller client 103 (of FIG. 1) may notify the other participants by sending notification messages by, for example, short messaging service (SMS) or email. A link is embedded in the notification message which the other participants select to start their respective request for joining the sharing session by sending the JOIN request to the server 101. Referring to FIG. 4, in block 402, the server 101 receives a JOIN request from a client 104. In block 404, the server 101 retrieves the component preference information either from the participant client 104 or from a configuration file.

In block 406, the server 101 determines whether the semantic components for the component type specified by the component preferences have been created. If no, the server 101 employs the component processor 207 to create the semantic components accordingly in block 408. Once the target semantic components are created, the server 101 employs the client interface 212 to setup or configure a push channel in preparation to push semantic components to the participant client 104 in block 410.

Figure 5:
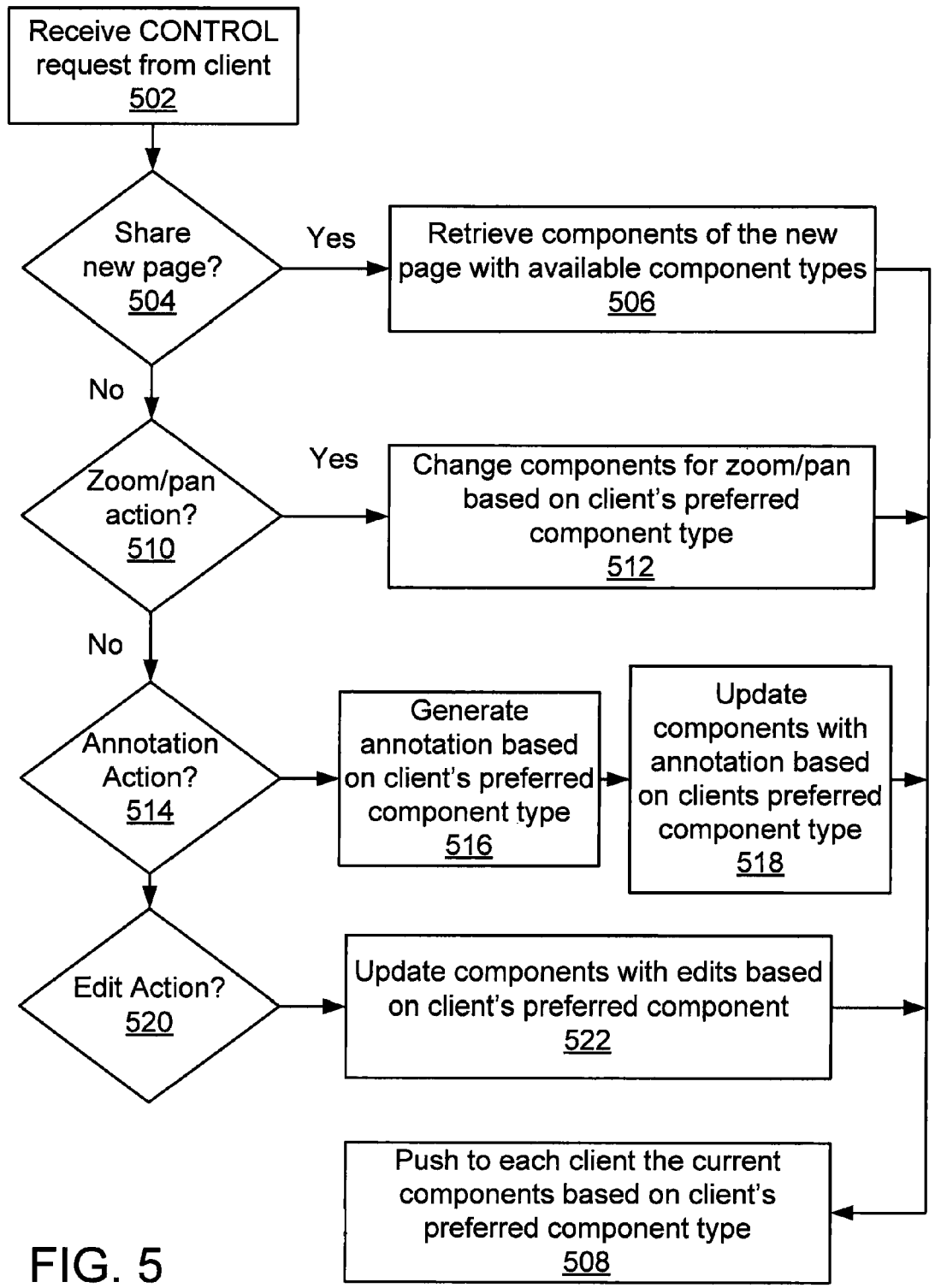
FIG. 5 illustrates a block diagram of an exemplary method for processing a CONTROL request.

FIG. 5 illustrates a block diagram of an exemplary method for processing a CONTROL request. In block 502, the server 101 (of FIG. 1) receives a CONTROL request that may include control actions from the control client 103. In block 504, the server 101 determines whether the control action includes starting sharing a new page. If yes, the server 101 employs the presentation manager 210 to retrieve the proper semantic components for the new page for all component types specified in the component preference info in block 506. The server 101 pushes the semantic components to the clients in block 508. In block 510, if the control action is a zoom/pan action, the control manager 213 processes changes to the semantic components in block 512. For example the server 101 may only send the viewable area within the page modeled by an image component to the client. When the controller client 103 takes a zoom/pan action, the viewable area of the page changes. Upon receiving a zoom/pan CONTROL request, the server 101 changes the viewable areas within the image components accordingly, before pushing them to the clients in block 508. In block 514, if the control request is to add an annotation, the control manager 213 creates an annotation artifact for each type of current semantic component in block 516. The server 101 employs the presentation manager 210 to incorporate the annotation artifacts to the current components (Step 509), before pushing these components to the Client (Step 512). In block 520, if the control request is to edit a page, the Server employs the control manager 213 to update current semantic components with the new edits in block 522 before pushing the updated components to the client in block 508.

Figure 6:
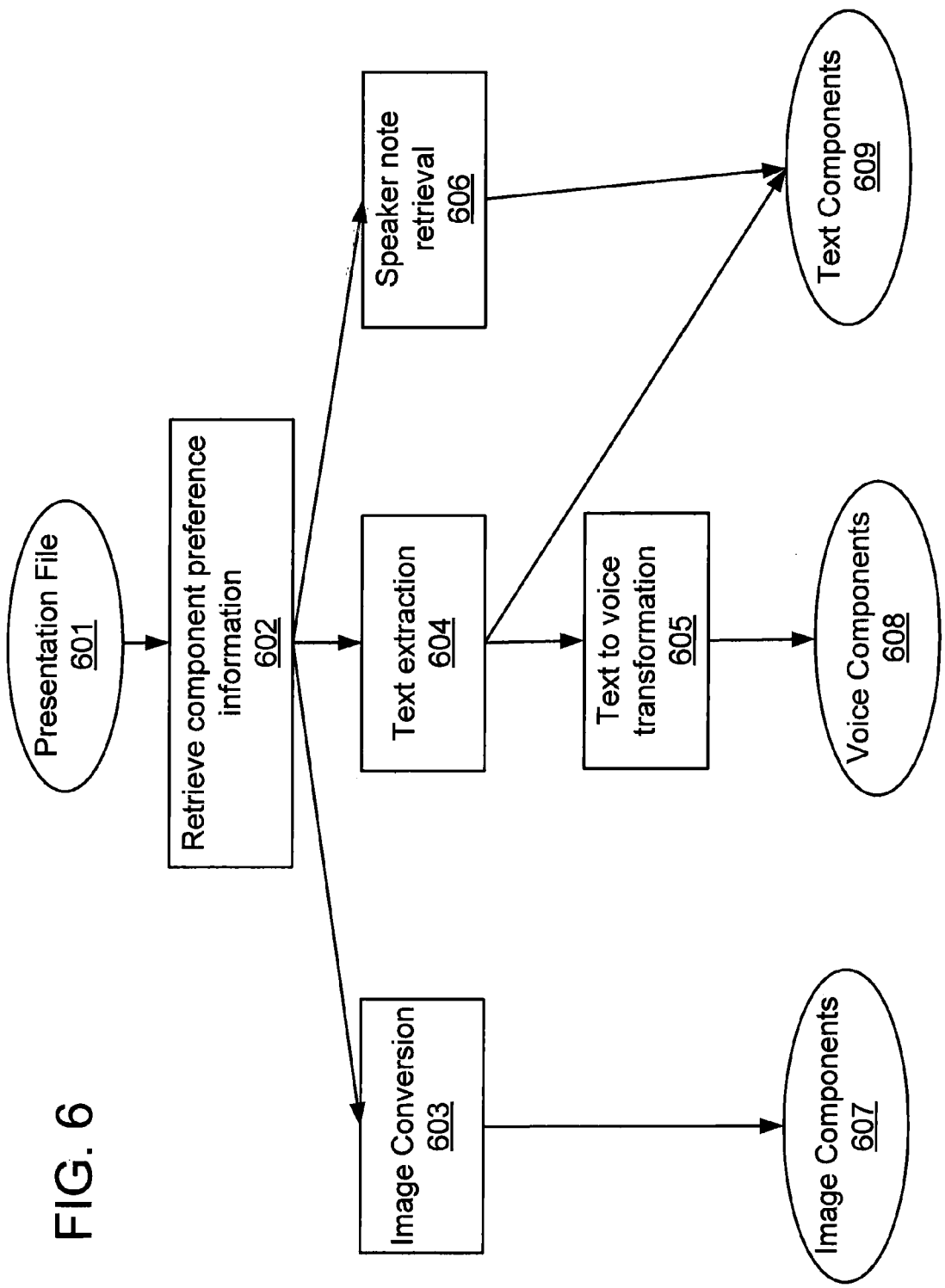
FIG. 6 illustrates a block diagram of an exemplary method of processing a file.

FIG. 6 illustrates a block diagram of an exemplary method of processing a presentation file. In this regard, in the illustrated example, the shared document includes a presentation file 601 such as a slide presentation file. The component processor 207 receives the presentation file 601 as input and retrieves component preferences info either from clients 103, 104, and 105 or from a configuration file in block 602. If the preference info includes image component types, then the component processor 207 converts the input file in block 603 into image components 607, each is a slide image of the input presentation file. Such conversion may be achieved by using document-to-image conversion software. If the preference info includes a voice component type, the component processor 207 extracts text from the input file in block 604 and uses text-to-voice software to convert text into voice components 608 in block 605. If text component type is included in the component preference info, then component processor 207 extracts text from the input file in block 604 to create text components 609. If the component preference info includes a speaker note component type, the component processor 207 extracts speaker notes from the input file in block 606 and converts the notes into text components 609.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for sharing documents, the system comprising:
   a server operative to:
   initiate a sharing session for sharing a document between a first participant and a second participant, wherein the first participant is communicatively connected to the second participant via the server;
   receive a control request having an action from the first participant;
   determine whether the control request includes a share page action;
   convert the document into a plurality of components, wherein each of the plurality of components represents a page of the document and wherein multiple components having a different type are created for each page;
   retrieve components of the page with available component types; and
   send components having a type associated with preferences of the first participant to the first participant and components having the type associated with preferences of the second participant to the second participant responsive to determining that the control request includes the share page action,
   wherein the first participant includes a mobile device and the type associated with preferences of the first participant includes a text component, an image component and a voice component.

2. The system of claim 1, wherein the initiating the sharing session includes:
   sending metadata associated with a document to the first participant;
   receiving a START request from the first participant that includes an identifier of a target document;
   retrieving the target document from a repository;
   retrieving component preferences associated with the first participant;
   generating a semantic component of the document associated with the component preferences;
   generating a thumbnail image of the semantic component; and
   sending the thumbnail image and an identifier of the session to the first participant.

3. The system of claim 1, wherein the initiating the sharing session includes:
   receiving a JOIN request from the second participant;
   determining whether component preferences associated with the second participant are available;
   retrieving component preferences associated with the second participant responsive to determining that the component preferences are available;
   generating component preferences associated with the second participant responsive to determining that the component preferences are not available; and
   configuring a push channel associated with the second participant.

4. The system of claim 1, wherein the server is further operative to determine whether the control request includes a zoom or pan action, and change components of the page according to the zoom or pan action and sending components associated with the preferences of the first participant to the first participant and components associated with the preferences of the second participant to the second participant responsive to determining that the control request includes the zoom or pan action.

5. The system of claim 1, wherein the server is further operative to determine whether the control request includes an annotation action, generate the annotation, and change components of the page according to the annotation action and sending components associated with the preferences of the first participant to the first participant and components associated with the preferences of the second participant to the second participant responsive to determining that the control request includes the annotation action.

6. The system of claim 1, wherein the server is further operative to determine whether the control request includes an edit action, and change components of the page according to the edit action and sending components associated with the preferences of the first participant to the first participant and components associated with the preferences of the second participant to the second participant responsive to determining that the control request includes the edit action.

7. A non-transitory computer-readable storage medium including computer executable instructions that, when executed on a processor of a computer apparatus, direct the processor to perform a method for sharing documents, the method comprising:
   initiating a sharing session for sharing a document between a first participant and a second participant, wherein the first participant is communicatively connected to the second participant via a server;
   receiving a control request having an action from the first participant;
   determining whether the control request includes a share page action;
   converting the document into a plurality of components, wherein each of the plurality of components represents a page of the document and wherein multiple components having a different type are created for each page;
   retrieving components of the page with available component types; and
   sending components having a type associated with preferences of the first participant to the first participant and components having the type associated with preferences of the second participant to the second participant responsive to determining that the control request includes the share page action, wherein the first participant includes a mobile device and the type associated with preferences of the first participant includes a text component, an image component and a voice component.

8. The computer-readable storage medium of claim 7, wherein the initiating the sharing session includes:
sending metadata associated with a document to the first participant;
receiving a START request from the first participant that includes an identifier of a target document;
retrieving the target document from a repository;
retrieving component preferences associated with the first participant;
generating a semantic component of the document associated with the component preferences;
generating a thumbnail image of the semantic component; and
sending the thumbnail image and an identifier of the session to the first participant.

9. The computer-readable storage medium of claim 7, wherein the initiating the sharing session includes:
receiving a JOIN request from the second participant;
determining whether component preferences associated with the second participant are available;
retrieving component preferences associated with the second participant responsive to determining that the component preferences are available;
generating component preferences associated with the second participant responsive to determining that the component preferences are not available; and
configuring a push channel associated with the second participant.

10. The computer-readable storage medium of claim 7, wherein the method further includes:
determining whether the control request includes a zoom or pan action; and
changing components of the page according to the zoom or pan action and sending components associated with the preferences of the first participant to the first participant and components associated with the preferences of the second participant to the second participant responsive to determining that the control request includes the zoom or pan action.

11. The computer-readable storage medium of claim 7, wherein the method further includes:
determining whether the control request includes an annotation action;
generating the annotation; and
changing components of the page according to the annotation action and sending components associated with the preferences of the first participant to the first participant and components associated with the preferences of the second participant to the second participant responsive to determining that the control request includes the annotation action.

12. The computer-readable storage medium of claim 7, wherein the method further includes:
determining whether the control request includes an edit action; and
changing components of the page according to the edit action and sending components associated with the preferences of the first participant to the first participant and components associated with the preferences of the second participant to the second participant responsive to determining that the control request includes the edit action.

13. The computer-readable storage medium of claim 7, wherein the voice component is created by converting a text of the page of the document into voice using a text to voice transformation.

14. The system of claim 1, wherein the voice component is created by converting a text of the page of the document into voice using a text to voice transformation.

* * * * *